United States Patent
Markov et al.

(10) Patent No.: US 9,154,939 B2
(45) Date of Patent: Oct. 6, 2015

(54) SYSTEM AND METHOD FOR MANAGING IDENTITY INFORMATION AFTER A SIM SWAP

(75) Inventors: Nikolay Tzankov Markov, Toronto (CA); David Bukurak, Ottawa (CA); Raymond Lee Canton, Ottawa (CA); Avinash Chidambaram, Mississauga (CA); Alan Panezic, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 147 days.

(21) Appl. No.: 13/250,830

(22) Filed: Sep. 30, 2011

(65) Prior Publication Data
US 2012/0309353 A1    Dec. 6, 2012

Related U.S. Application Data
(60) Provisional application No. 61/492,252, filed on Jun. 1, 2011.

(51) Int. Cl.
| | | |
|---|---|---|
| *H04M 1/66* | (2006.01) | |
| *H04W 8/18* | (2009.01) | |
| *H04L 29/06* | (2006.01) | |
| *H04W 8/20* | (2009.01) | |
| *H04W 12/06* | (2009.01) | |

(52) U.S. Cl.
CPC .............. *H04W 8/183* (2013.01); *H04L 63/083* (2013.01); *H04W 8/20* (2013.01); *H04W 12/06* (2013.01)

(58) Field of Classification Search
CPC ............ H04M 1/6075; H04M 1/6091; H04M 2203/256; H04M 1/66; H04M 3/2227
See application file for complete search history.

(56) References Cited

U.S. PATENT DOCUMENTS
| | | | | |
|---|---|---|---|---|
| 2002/0147924 A1* | 10/2002 | Flyntz | ........................ | 713/200 |
| 2008/0028221 A1* | 1/2008 | Endo et al. | ................... | 713/176 |
| 2008/0113651 A1* | 5/2008 | Choi | ............................ | 455/411 |

(Continued)

FOREIGN PATENT DOCUMENTS
EP        1075155 A1    2/2001
(Continued)

OTHER PUBLICATIONS
Ma, Cathy; International Search Report from corresponding PCT Application No. PCT/CA2012/050371; Search completed on Aug. 14, 2012.
Grimaldo, Michele; Partial European Search Report from corresponding European Application No. EP11183384; search completed on Jun. 11, 2013.
Canadian Office Action dated May 7, 2015 received for Canadian Application No. 2,837,779.

*Primary Examiner* — Keith Fang
(74) *Attorney, Agent, or Firm* — Jon Gibbons; Fleit Gibbons Gutman Bongini & Bianco P.L.

(57) ABSTRACT

A system and a method are provided managing services associated with a mobile device. It includes detecting a new identity module card is in the mobile device; receiving a username ID and a password on the mobile device; and upon verifying that the username ID and the password are identical to a previous username ID and a previous password associated with the mobile device, the mobile device enabling access to the services. In another aspect, after detecting a new identity module card, and if an input is received to associate a new username ID and a new password with the mobile device, then the services are erased from the mobile device.

18 Claims, 13 Drawing Sheets

(56) References Cited

U.S. PATENT DOCUMENTS

2009/0070855 A1* 3/2009 Hori et al. .................... 726/2
2010/0297983 A1* 11/2010 Aarni et al. ................ 455/411
2011/0059738 A1 3/2011 Waller
2011/0087705 A1 4/2011 Swink et al.

FOREIGN PATENT DOCUMENTS

| GB | 2324004 A | 10/1998 |
| GB | 2438452 A | 11/2007 |
| WO | 2004066664 A1 | 8/2004 |
| WO | 2009153402 A1 | 12/2009 |

* cited by examiner

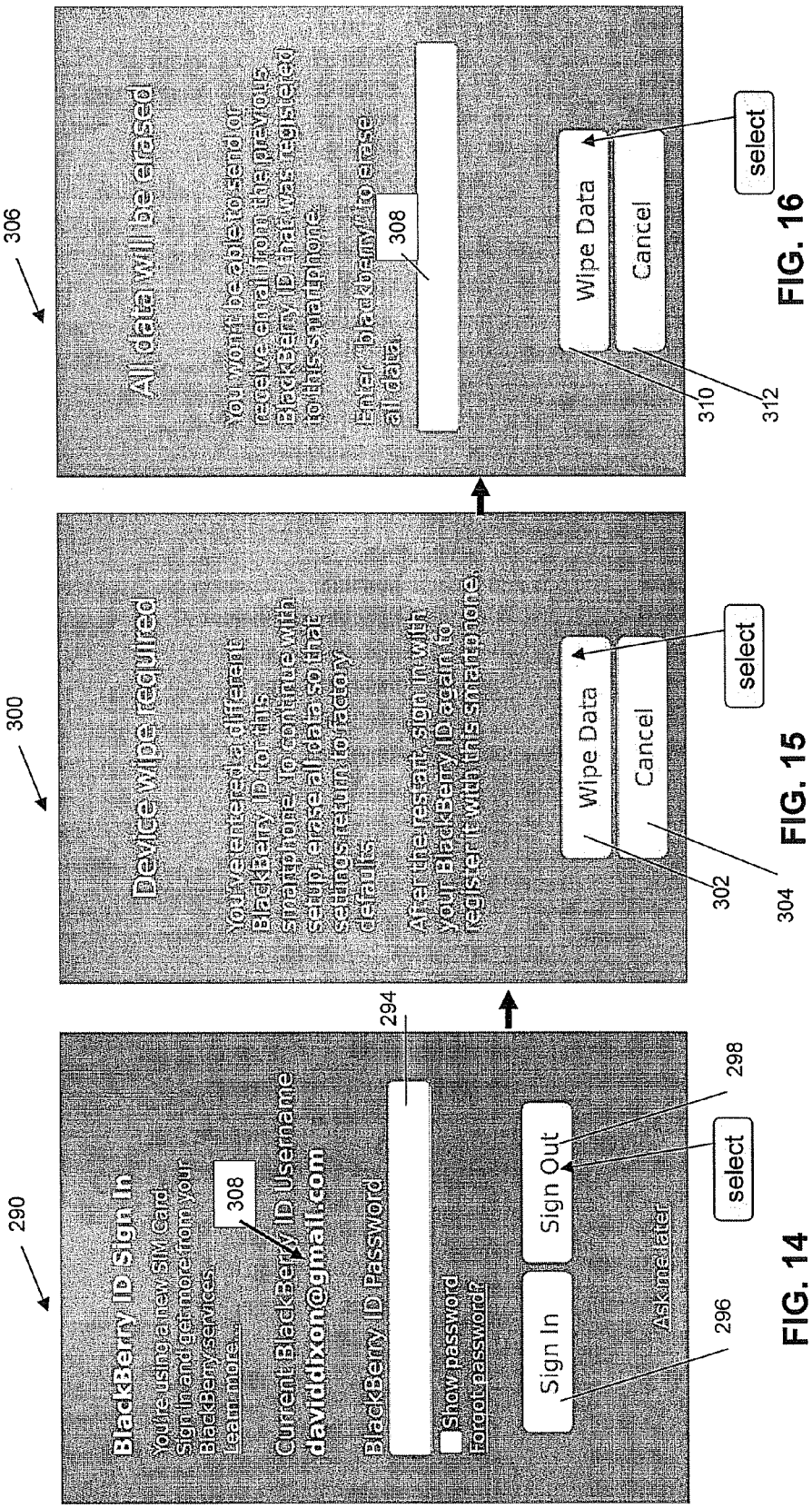

SYSTEM AND METHOD FOR MANAGING IDENTITY INFORMATION AFTER A SIM SWAP

CROSS-REFERENCE TO RELATED APPLICATIONS

This application claims priority from U.S. Provisional Application No. 61/492,252 filed on Jun. 1, 2011, the contents of which are hereby incorporated by reference in their entirety.

TECHNICAL FIELD

The following relates generally to managing identity information after exchanging a an identity module card for another identity module card in a mobile device.

DESCRIPTION OF THE RELATED ART

Many mobile devices use a subscriber identity module or subscriber identification module (SIM), which is an integrated circuit that stores a service-subscriber key (IMSI) and is typically used to identify a subscriber on a mobile device or a computing device with telephony capabilities. A SIM is held on a SIM card, which can be transferred between different mobile devices. Other forms of the SIM card include a mini-SIM card and a micro-SIM card.

A SIM card includes various types of data, including: its unique serial number, for example the Integrated circuit card identifier (ICCID); its internationally unique number of the mobile user, for example the International mobile subscriber identity (IMSI); its security authentication and ciphering information; its temporary information related to the local network, for example the Location Area Identity (LAI); a list of the services the user has access to; and two passwords, for example a PIN for the usual use and a PIN Unlock Key (PUK) for unlocking.

A SIM is one example of a smart card. Other examples that are applicable to the principles described herein include a Removable User Identity Module (RUIM) and a Universal Subscriber Identity Module (USIM).

BRIEF DESCRIPTION OF THE DRAWINGS

Embodiments will now be described by way of example only with reference to the appended drawings wherein:

FIG. 14 is a screenshot of an example GUI for signing into or signing out of a username ID account upon detecting a new SIM card.

FIG. 15 is a screenshot of an example GUI for initiating the process of wiping data from the mobile device.

FIG. 16 is a screenshot of an example GUI to confirm wiping data from the mobile device.

DETAILED DESCRIPTION

Figure 1:
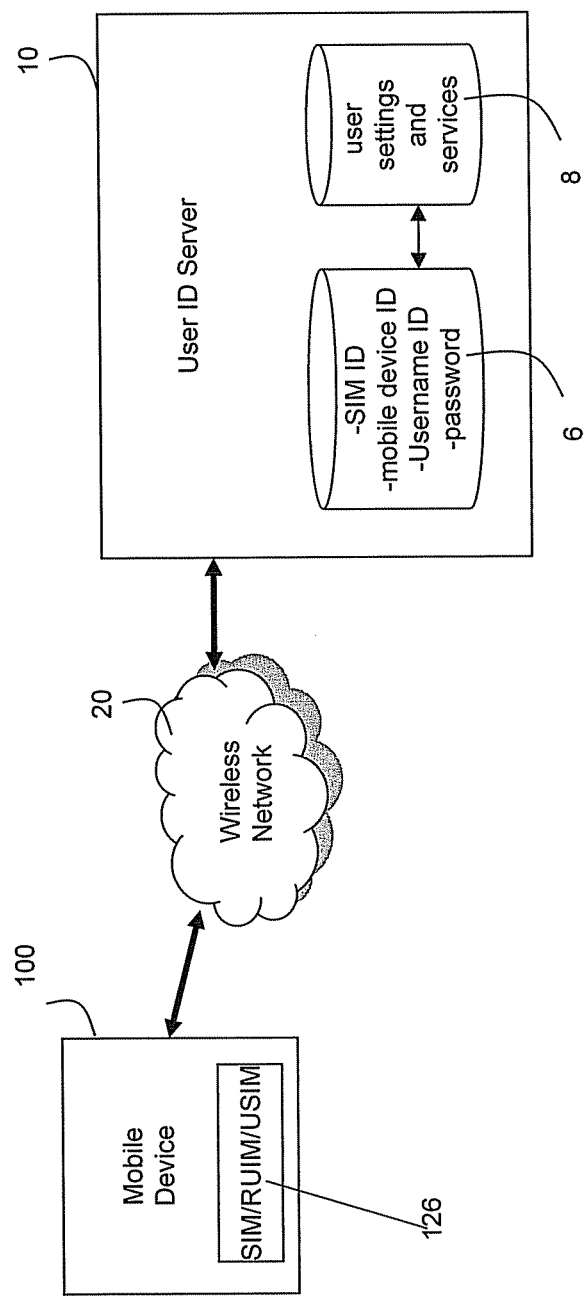
FIG. 1 a schematic diagram of a mobile device in communication with a user ID server.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

When exchanging or swapping one SIM card in a mobile device for another SIM card, typically the software and data services available to the mobile device are changed or terminated, or both. This can be undesirable, for example, when a user wishes to exchange SIM cards and still maintain the software and data services.

In an example scenario, a user is resident in the United States and has a SIM card suitable to local data or phone carriers. The user may have certain data services or software services associated with the SIM card. When the user travels to another country, such as Portugal, the user switches or replaces the SIM card with a new SIM card that is suitable for Portugal. However, when doing so, the data services or software services associated with the SIM card (as used in the United States), are terminated or no longer available. To recover the same data services or software services, the user may need to register or sign up for the services again under the new SIM card. This can be time consuming and incur costs. In some cases, the services may not be available with the new SIM card.

Other mobile devices, such as CDMA-type devices, may not have a removable physical card. However, when changing the unique identifier of the CDMA-device, the user also may need to re-register for services on the mobile device.

Systems and methods are provided to address these issues. A username ID is used to provide continuity and control over services even when a SIM card is switched or replaced with another SIM card. The principles described herein also apply to a CDMA device, in which a username ID can be used to provide continuity when the CDMA device's unique identifier is changed for another unique identifier. A non-limiting example of a username ID environment is available under the trade-mark Blackberry ID, provided by Research In Motion Limited.

Turning to FIG. 1, a mobile device 100 is shown containing a smart card 126, such as a SIM, RUIM, or USIM card. For readability, the smart card 126 is herein referred to as a SIM card 126. The mobile device 100 is in communication with a user ID server 10, for example through a wireless network 20. The user ID server 10 associates several data items with one another, including: a SIM identification, a mobile device identification, a username ID, and a password associated with the username ID. This data is stored on the database 6.

Continuing with FIG. 1, it will be appreciated that the associated IDs and the password form a unique combination, or combined entry. Each combined entry within the database 6 is associated with user settings and services (e.g. data services, software services) available to the user. Examples of services include email, instant messaging, social media applications, access to an applications server, and password protection applications. The user settings and services can be stored in another database 8.

Figure 2:
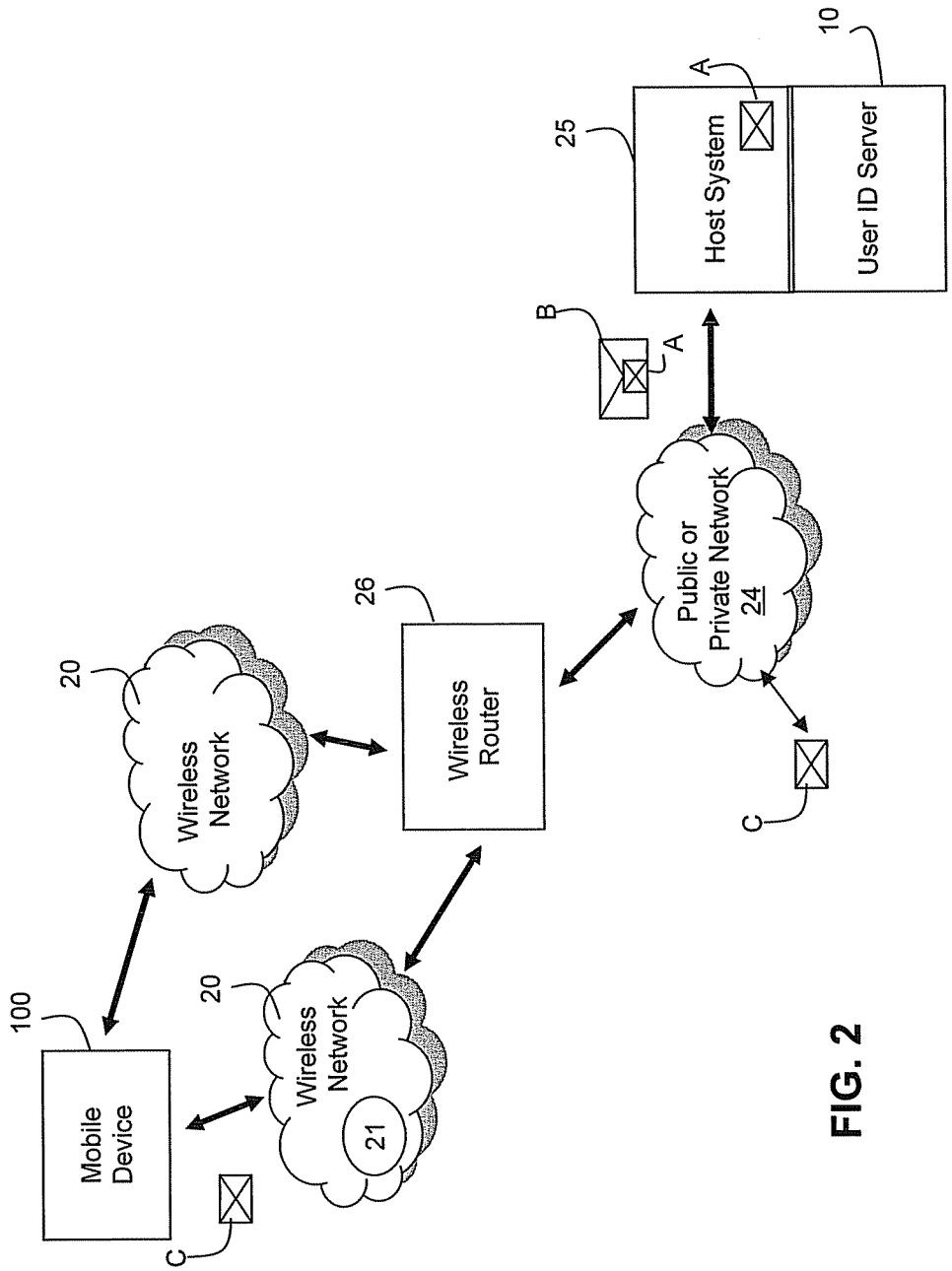
FIG. 2 is a schematic diagram of an example communication system including a mobile device, a wireless router, and a host system.

FIG. 2 is an example system diagram showing the redirection of user data items (such as message A or C) from a corporate enterprise computer system (host system) 25 to the user's mobile device 100 via a wireless router 26. The wireless router 26 provides the wireless connectivity functionality as it acts to both abstract most of the wireless network's 20 complexities, and it also implements features necessary to support pushing data to the mobile device 100. Although not shown, a plurality of mobile devices may access data from the host system 25. In this example, message A in FIG. 2 represents an internal message sent from, e.g. a desktop computer (not shown) within the host system 25, to any number of server computers in the corporate network (e.g. LAN), which may, in general, include a database server, a calendar server, an E-mail server or a voice-mail server.

In an example embodiment, the host system 25 may include the user ID server 10, or may be in communication with the user ID server 10.

Message C in FIG. 2 represents an external message from a sender that is not directly connected to the host system 25, such as the user's mobile device 100, some other user's mobile device (not shown), or any user connected to the public or private network 24 (e.g. the Internet). Message C could be e-mail, voice-mail, calendar information, database updates, web-page updates or could even represent a command message from the user's mobile device 100 to the host system 25. The host system 25 may comprise, along with the typical communication links, hardware and software associated with a corporate enterprise computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a corporate firewall.

The mobile device 100 may be adapted for communication within wireless network 20 via wireless links, as required by each wireless network 20 being used. As an illustrative example of the operation for a wireless router 26 shown in FIG. 2, consider a data item A, repackaged in outer envelope B (the packaged data item A now referred to as "data item (A)") and sent to the mobile device 100 from an Application Service Provider (ASP) in the host system 25. Within the ASP is a computer program, similar to a wireless mobility agent, running on any computer in the ASP's environment that is sending requested data items from a data store to a mobile device 100. The mobile-destined data item (A) is routed through the network 24, and through the wireless router's 26 firewall protecting the wireless router 26 (not shown).

Although the above describes the host system 25 as being used within a corporate enterprise network environment, this is just one embodiment of one type of host service that offers push-based messages for a handheld wireless device that is capable of notifying and presenting the data to the user in real-time at the mobile device when data arrives at the host system.

By offering a wireless router 26 (sometimes referred to as a "relay", "message server", "data redirector", etc.), there are a number of major advantages to both the host system 25 and the wireless network 20. The host system 25 in general runs a host service that is considered to be any computer program that is running on one or more computer systems. The host service is said to be running on a host system 25, and one host system 25 can support any number of host services. A host service may or may not be aware of the fact that information is being channelled to mobile devices 100. For example an e-mail or message program 138 (see FIG. 5) might be receiving and processing e-mail while an associated program (e.g. an e-mail wireless mobility agent) is also monitoring the mailbox for the user and forwarding or pushing the same e-mail to a wireless device 100. A host service might also be modified to prepared and exchange information with mobile devices 100 via the wireless router 26, like customer relationship management software. In a third example, there might be a common access to a range of host services. For example a mobility agent might offer a Wireless Access Protocol (WAP) connection to several databases.

Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 100 and wireless network 20, offer push services to standard web-based server systems and allow a host service in a host system 25 to reach the mobile device 100 in many countries.

The host system 25 shown herein can have many methods when establishing a communication link to the wireless router 26. For one skilled in the art of data communications the host system 25 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of host systems 25 that might employ the wireless router 26 to perform push could include: field service applications, e-mail services, stock quote services, banking services, stock trading services, field sales applications, advertising messages and many others. This wireless network 20 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 25, or that the host system 25 acquires through the use of intelligent agents, such as data that is received after the host system 25 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 25, the wireless router 26 may implement a set of defined functions. It can be appreciated that one could select many different hardware configurations for the wireless router 26, however, many of the same or similar set of features would likely be present in the different configurations.

It will be appreciated that mobile devices 100 include, for example, pagers, cellular phones, cellular smart-phones, wireless organizers, personal digital assistants, computers, laptops, handheld wireless communication devices, wirelessly enabled notebook computers, tablet devices and the like. Such devices will hereinafter be commonly referred to as "mobile devices" for the sake of clarity. It will however be appreciated that the principles described herein are also suitable to other devices, e.g. "non-mobile" devices.

Figure 4:
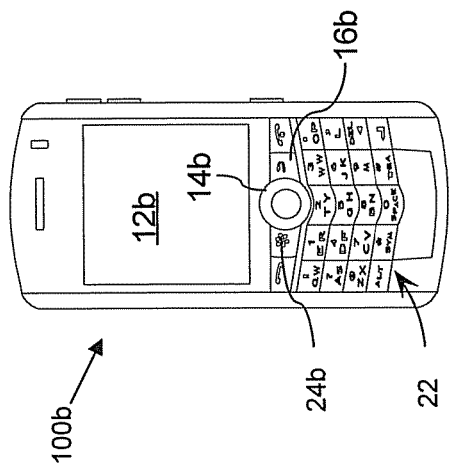
FIG. 4 is a plan view of another example mobile device and a display screen therefor.
Figure 3:
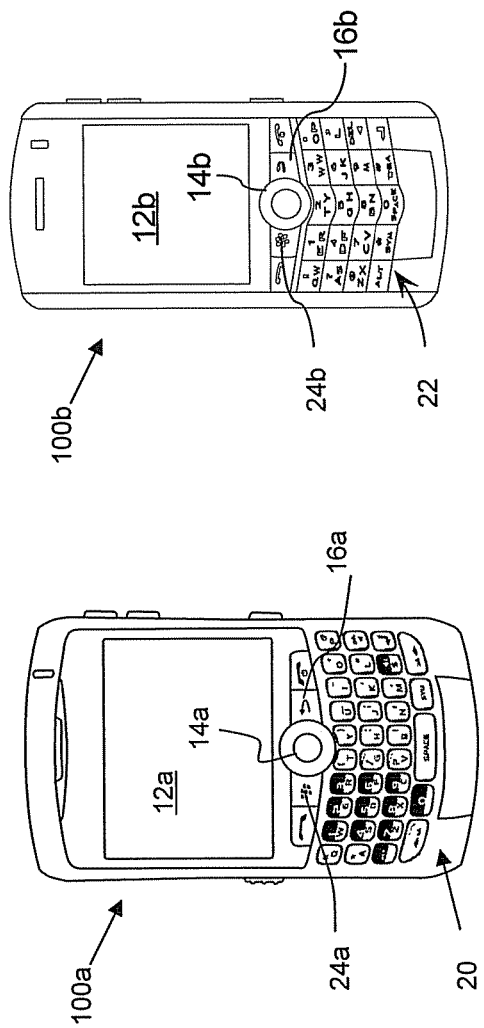
FIG. 3 is a plan view of an example mobile device and a display screen therefor.

Referring to FIGS. 3 and 4, one embodiment of a mobile device 100a is shown in FIG. 3, and another embodiment of a mobile device 100b is shown in FIG. 4. It will be appreciated that the numeral "100" will hereinafter refer to any mobile device 100, including the embodiments 100a and 100b, those embodiments enumerated above or otherwise. It will also be appreciated that a similar numbering convention may be used for other general features common between all figures such as a display 12, a positioning device 14, a cancel or escape button 16, and a menu or option button 24. Mobile device 100a is shown with a full QWERTY keyboard 20, while the other mobile device 100b is shown with a reduced QWERTY keyboard 22.

It will be appreciated that for the mobile device 100, a wide range of one or more cursor or view positioning devices or input devices (such as e.g. a touch pad, a positioning wheel, a joystick button, a mouse, a touchscreen, a set of arrow keys, a tablet, an accelerometer (for sensing orientation and/or movements of the mobile device 100 etc.), or other whether presently known or unknown), may be employed. Similarly, any variation of keyboard 20, 22 may be used. It will also be appreciated that the mobile devices 100 shown in FIGS. 3 and 4 are for illustrative purposes only and various other mobile devices 100 are equally applicable to the following examples. For example, other mobile devices 100 may include the trackball 14b, escape button 16b and menu or option button 24 similar to that shown in FIG. 4 only with a full or standard keyboard of any type. Other buttons may also be disposed on the mobile device housing such as colour coded "Answer" and "Ignore" buttons to be used in telephonic communications. In another example, the display 12 may itself be touch sensitive thus itself providing an input mechanism in addition to display capabilities.

Figure 5:
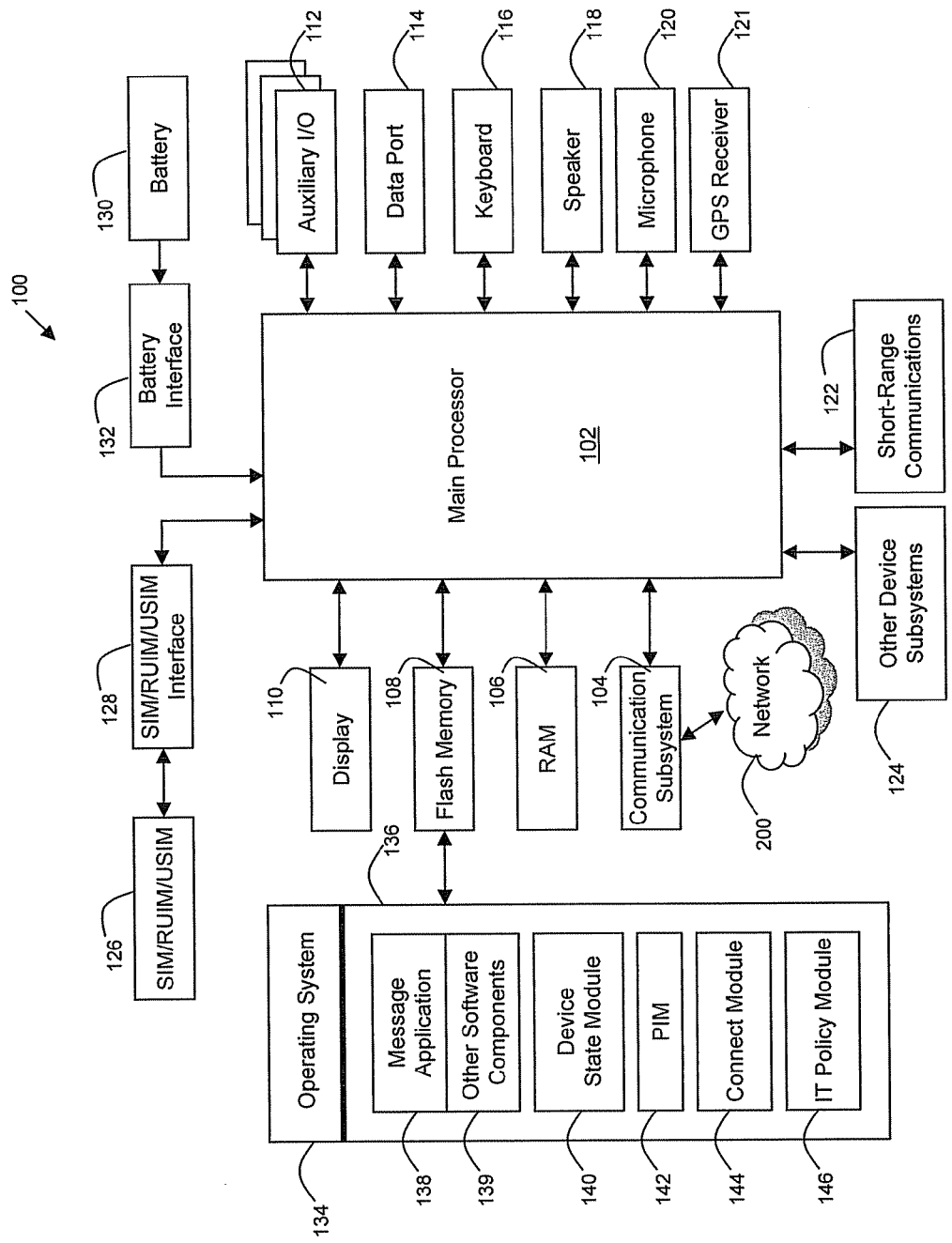
FIG. 5 is a block diagram of an example embodiment of a mobile device.
Figure 7:
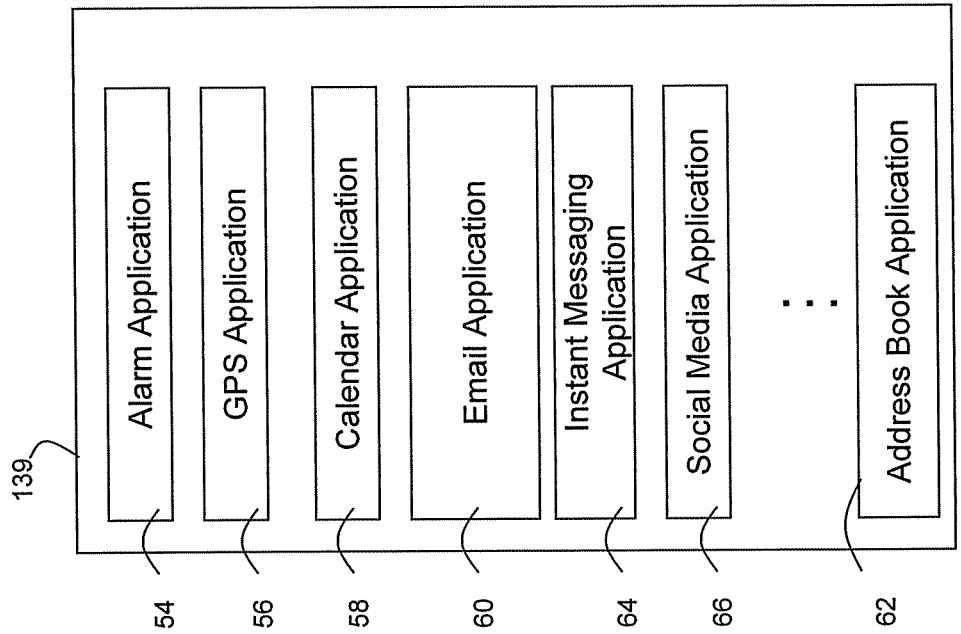
FIG. 7 is a block diagram illustrating example ones of the other software applications and components shown in FIG. 5.
Figure 6:
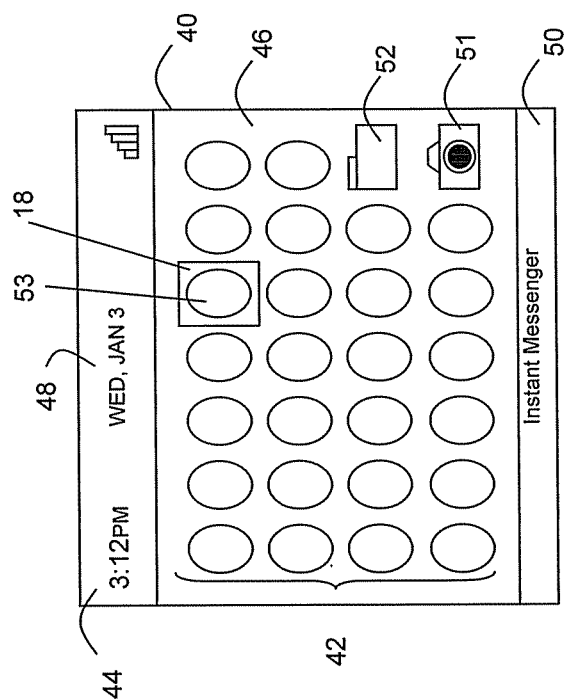
FIG. 6 is a screen shot of a home screen displayed by the mobile device.

An example configuration for the mobile device 100 is illustrated in FIGS. 5-7. Referring first to FIG. 5, shown therein is a block diagram of an example embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, a camera 123, a magnetometer 125, and other device subsystems 124. The display 110 can be a touch-screen display able to receive inputs through a user's touch.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, contacts, calendar events, and voice mails, and may interact with the wireless network 200. A connect module 144 implements the communication protocols that are required for the mobile device 100 to communicate with the wireless infrastructure and any host system, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

Turning now to FIG. 6, the mobile device 100 may display a home screen 40, which can be set as the active screen when the mobile device 100 is powered up and may constitute the main ribbon application. The home screen 40 generally comprises a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 6 provides a grid of icons. It will be appreciated that preferably several themes are available for the user to select and that any applicable arrangement may be used. An example icon may be a camera icon 51 used to indicate a camera-based application. One or more of the series of icons 42 is typically a folder 52 that itself is capable of organizing any number of applications therewithin.

The status region 44 in this embodiment comprises a date/time display 48. The theme background 46, in addition to a graphical background and the series of icons 42, also comprises a status bar 50. The status bar 50 provides information to the user based on the location of the selection cursor 18, e.g. by displaying a name for the icon 53 that is currently highlighted.

An application, such as message application 138 may be initiated (opened or viewed) from display 12 by highlighting a corresponding icon 53 using the positioning device 14 and providing a suitable user input to the mobile device 100. For example, message application 138 may be initiated by moving the positioning device 14 such that the icon 53 is highlighted by the selection box 18 as shown in FIG. 6, and providing a selection input, e.g. by pressing the trackball 14b.

FIG. 7 shows an example of the other software applications and components 139 that may be stored and used on the mobile device 100. Only examples are shown in FIG. 7 and such examples are not to be considered exhaustive. In this example, an alarm application 54 may be used to activate an alarm at a time and date determined by the user. There is also an address book 62 that manages and displays contact information. A GPS application 56 may be used to determine the location of a mobile device 100. A calendar application 58 that may be used to organize appointments. Another example application is an email application 60. Other applications include an instant messaging application 64 and a social media application 66.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100, or user ID server 10, or accessible or connectable thereto. Any application or module herein described may be implemented using computer readable/executable instructions or operations that may be stored or otherwise held by such computer readable media.

Figure 8:
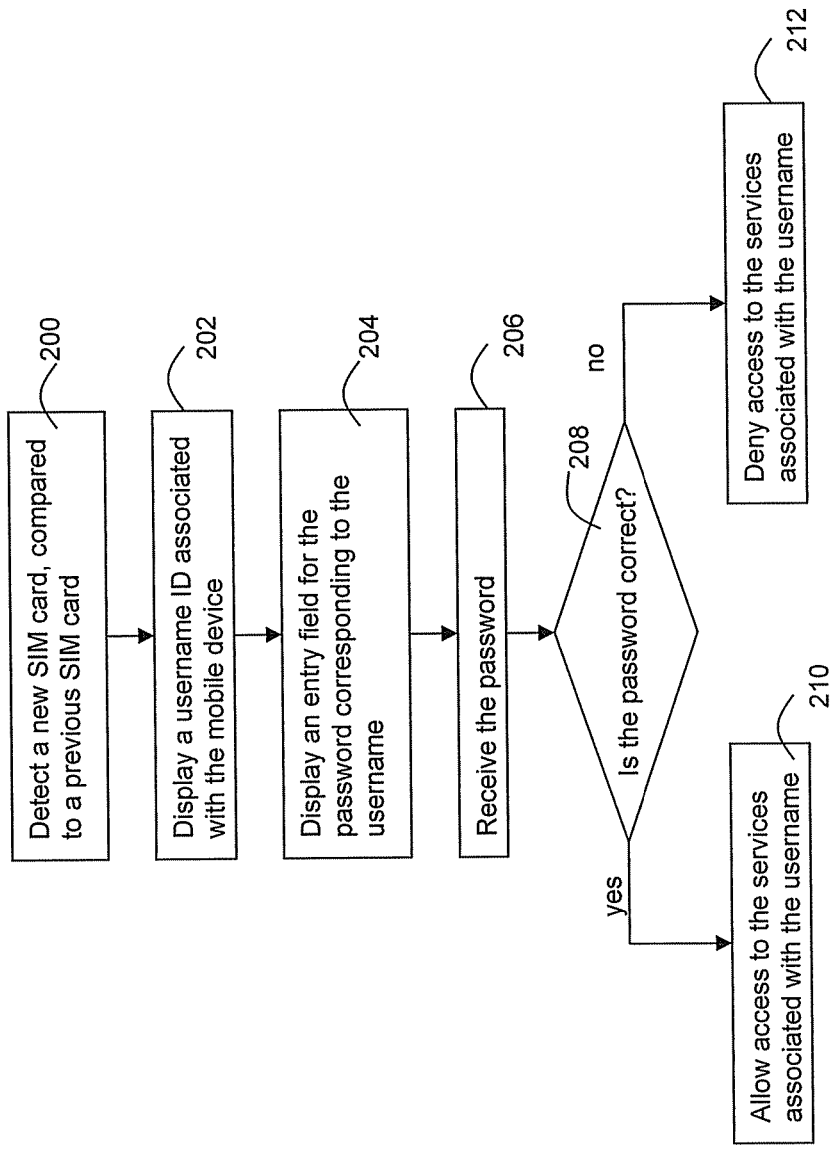
FIG. 8 is a flow diagram of example computer executable instructions for allowing or denying a mobile device access to services after detecting a new SIM card.

Turning to FIG. 8, example computer executable instructions are provided for a mobile device 100 to manage data and software services after detecting a new SIM card, or SIM swap. As discussed earlier, a username ID, password, mobile device ID and SIM card ID for the mobile device 100 are registered or stored on the user ID server 10. At block 200, the mobile device 100 detects a new SIM card, for example compared to the previous SIM card. There may also be a message shown that notifies that a new SIM card is detected in the mobile device 100.

In an example embodiment, the mobile device 100 sends the new SIM card ID and the mobile device ID to the user ID server 10. The user ID server 10 has a database 6 storing known combination of mobile device IDs and SIM card IDs. If the new SIM card ID cannot be found in association with the mobile device ID on the database 6, then the new SIM card ID is confirmed to be new. The mobile device 100 is then notified by the user ID server 10 that the SIM card is new.

At block 202, the mobile device 100 displays a username ID associated with the mobile device 100. At block 204, an entry field for receiving the password is displayed, whereby the password corresponds to the username ID. At block 206, the mobile device 100 receives the password. For example, the user enters in the password. At block 208, it is determined if the password for the username ID is correct. This can be determined, for example, by the mobile device 100 sending the password and other information to the user ID server 10 and the user ID server 10 returning an indication to the mobile device 100 whether or not the password and username ID is correct. If the password is correct, at block 210, the mobile device 100 is allowed access to services associated with the username ID. Otherwise, access to the services associated with the username is denied. In other words, if the user is able to authenticate after a SIM card swap using the username ID and password, the user can still access the same services. The services and data associated with the username ID and password are maintained, and the re-registration process is thus not required.

Figure 9:
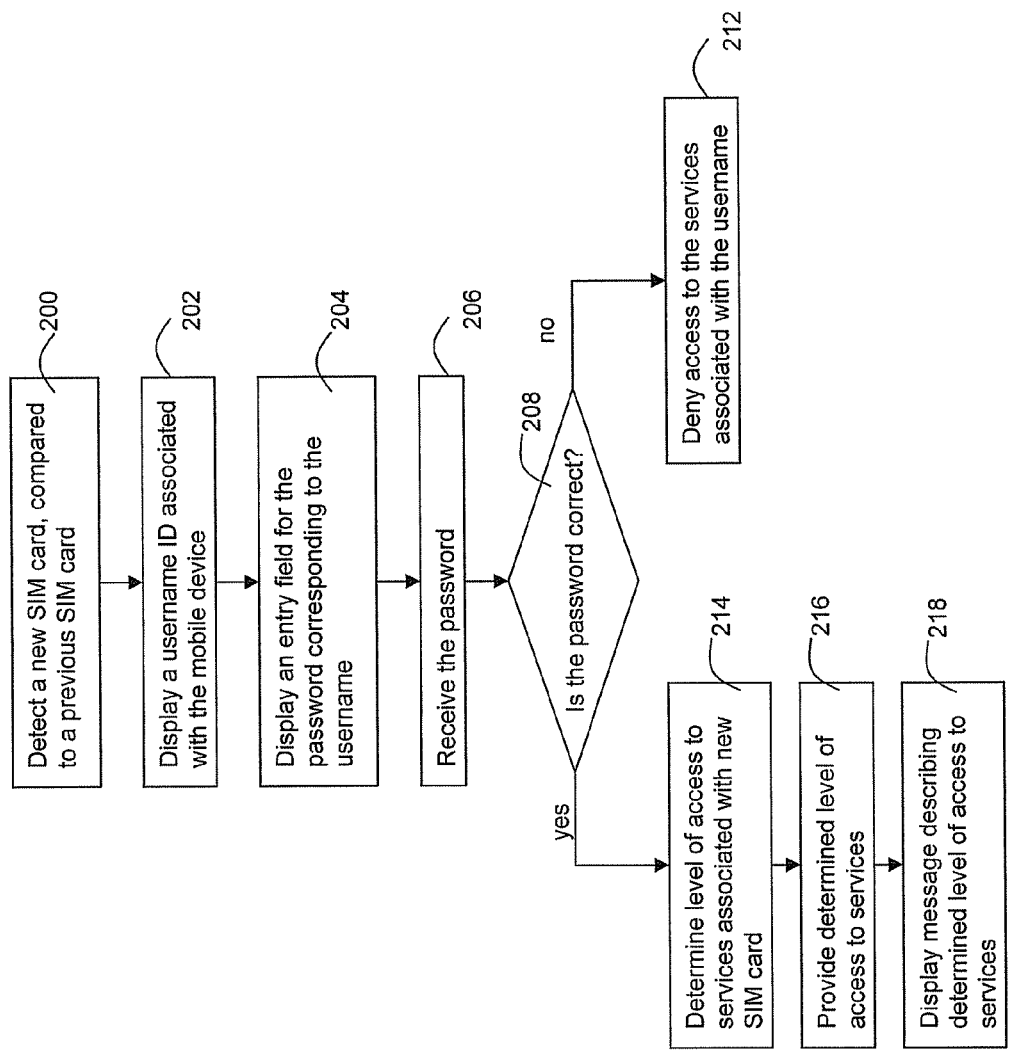
FIG. 9 is a flow diagram of example computer executable instructions for determining the level of access a mobile device has to services after detecting a new SIM card.

Turning to FIG. 9, blocks 200 to 208 are identical. However, if the password is determined to be correct, as per block 208, then the level of access to the services is determined based on the new SIM card (block 214). Then the mobile device 100 is provided the determined level of services (block 216). At block 218, a message is displayed describing the determined level of access to services.

The executable instructions of FIG. 9 provide tiered access to services based on the SIM card. For example, a user may have a comprehensive service plan when using a SIM card suitable for the United States. The user may have multiple email accounts and access to social media applications. When the user travels to Portugal, for example, the user replaces the SIM card with a new SIM card that is suitable for Portugal data and phone carriers. However, as the data and phone service tends to be more costly in Portugal than in the United States, therefore the mobile device 100 is only given access to a single email account when using the new SIM card in order to reduce the data loads and costs.

Figure 10:
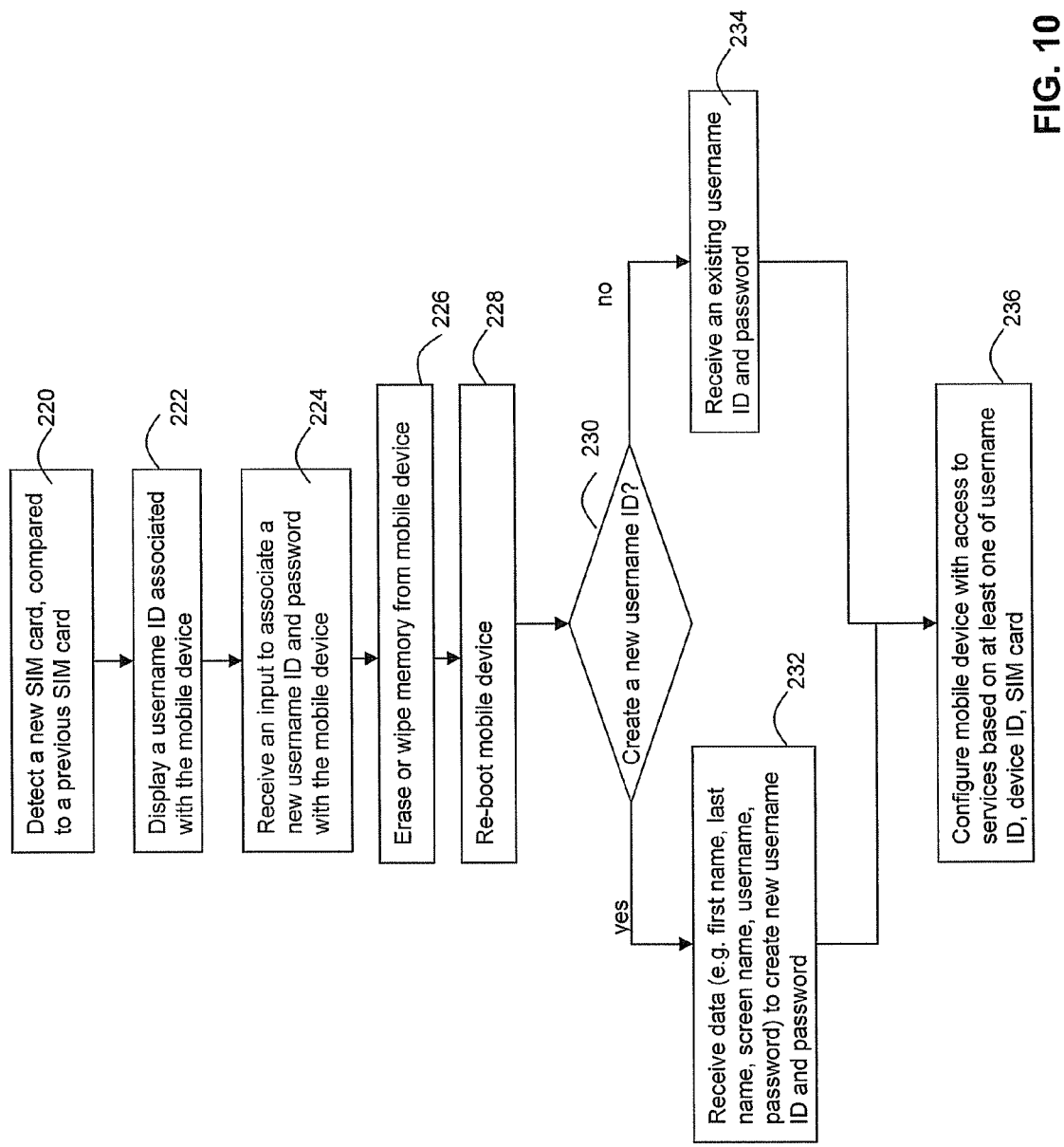
FIG. 10 is a flow diagram of example computer executable instructions for, upon detecting a new SIM card, wiping memory from the mobile device.

FIG. 10 shows example computer executable instructions for erasing or wiping memory from a mobile device 100 after replacing a SIM card with a new SIM card. At block 220, the mobile device 100 detects a new SIM card. In an example embodiment, if a new SIM card is detected, then the mobile device 100 is logged out of the username ID account and the services associated with the username ID account.

At block 222, a username ID associated with the mobile device 100 is displayed. Alternatively, the mobile device 100 may display an entry field for the username ID, requesting the user to input the username ID. At block 224, the mobile device 100 receives an input to associate a new username ID and password with the mobile device 100. This can happen, for example, if a first user gives a mobile device to a second user, and the second user replaces the first user's SIM card with the second user's SIM card. The second user may then wish to use the second user's username ID and password.

At block 226, the mobile device 100 wipes or erases its memory. This reduces the risk of the new user from accessing data belonging to the previous user.

At block 228, the mobile device 100 is re-booted. At block 230, the mobile device 100 prompts the user to create a new username ID account, or to use an existing account.

If the user would like to create a new username ID and password, then the mobile device 100 receives information to create the same (block 232). For example, the mobile device receives the user's first name, last name, screen name, username ID, password, secret question to recover the password, etc. If the user would like to use an existing username ID and password that is new or different compared to the one being used with the previous SIM card, then the mobile device 100 receives from the user the new username ID and password (block 234).

At block 236, the mobile device 100 is configured to access data and software services based on at least one of the following: username ID, mobile device ID, and SIM card ID.

Figure 11:
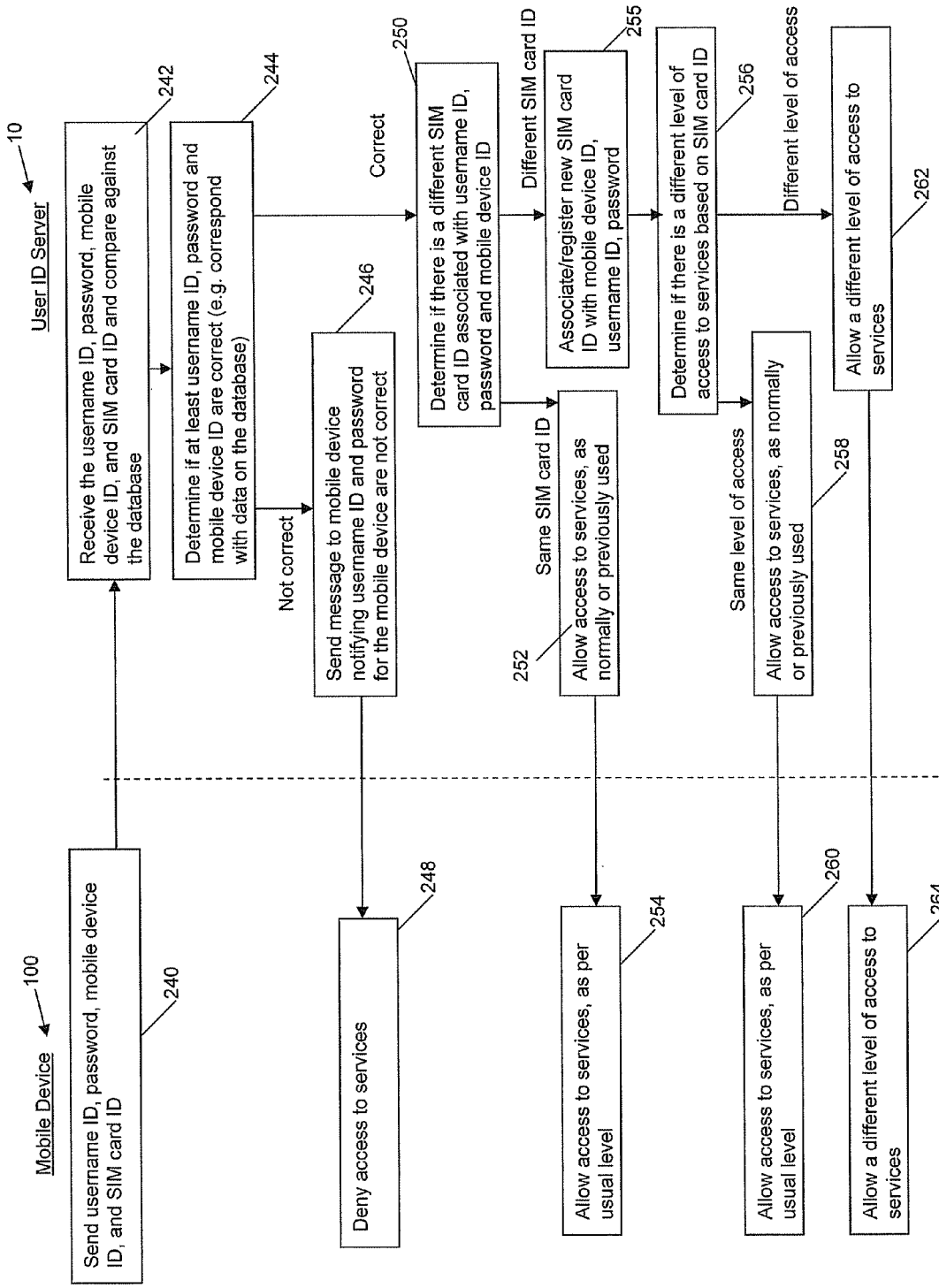
FIG. 11 is a flow diagram of example computer executable instructions for a mobile device and a user ID server to allow or deny access to the mobile device for services based on the SIM card.

FIG. 11 shows example computer executable instructions performed by both the mobile device 100 and the user ID server 10. The user ID server 10 may be used to authenticate the username ID and password, as well as determine the level of access to services based on the SIM card ID, or the username ID, or both. These executable instructions can be used in combination with the other instructions described herein, such as those described in FIGS. 8, 9 and 10.

At block 240, the mobile device 100 sends a username ID, password, mobile device ID and SIM card ID to the user ID server 10. At block 242, the user ID server 10 receives the data and compares this data against the database 6. The user ID server 10 then determines if at least the username ID, password and mobile device ID are correct (block 244). For example, if the received username ID and password correspond to the username ID and the password stored on the database 6, then the received data is correct. Other data can be compared, such as the mobile device ID.

If the data is not correct, then the user ID server 10 sends a message to the mobile device 100 notifying that the username ID and password for the mobile device 100 are not correct (block 246). The mobile device 100 receives the message and denies access to services (block 248).

If the received data is correct, at block 250, the user ID server 10 then determines whether there is a different SIM card associated with the username ID, password and mobile device ID.

If it is the same SIM card as before (e.g. there was no SIM card swap), then the user ID server 10 allows the mobile device 100 access to the services as normally or previously used (block 252). If it is a different SIM card (e.g. a new SIM card has replaced the previous SIM card), then the user ID server 10 associates or registers the new SIM card ID with the mobile device ID, username ID, and password (block 255). The user ID server 10 then determines whether there is a different level of access to the services based on the SIM card ID (block 256). If not, then at block 258, the user ID server 10 allows access to the services and data as normally or previously used. In other words, the settings associated with the username ID are maintained on the mobile device 100, even after a SIM card swap. At block 260, the mobile device 100 is allowed access to the usual level of services.

However, if it is determined that a different level of access is granted to the mobile device 100 based on the SIM card, then at block 262, the user ID server 10 grants a different level of access to the services. This different level of access is applied to the mobile device 100 (block 264). It can be appreciated that the different level of access may grant access to more services, or may grant access to less services.

Figure 12:
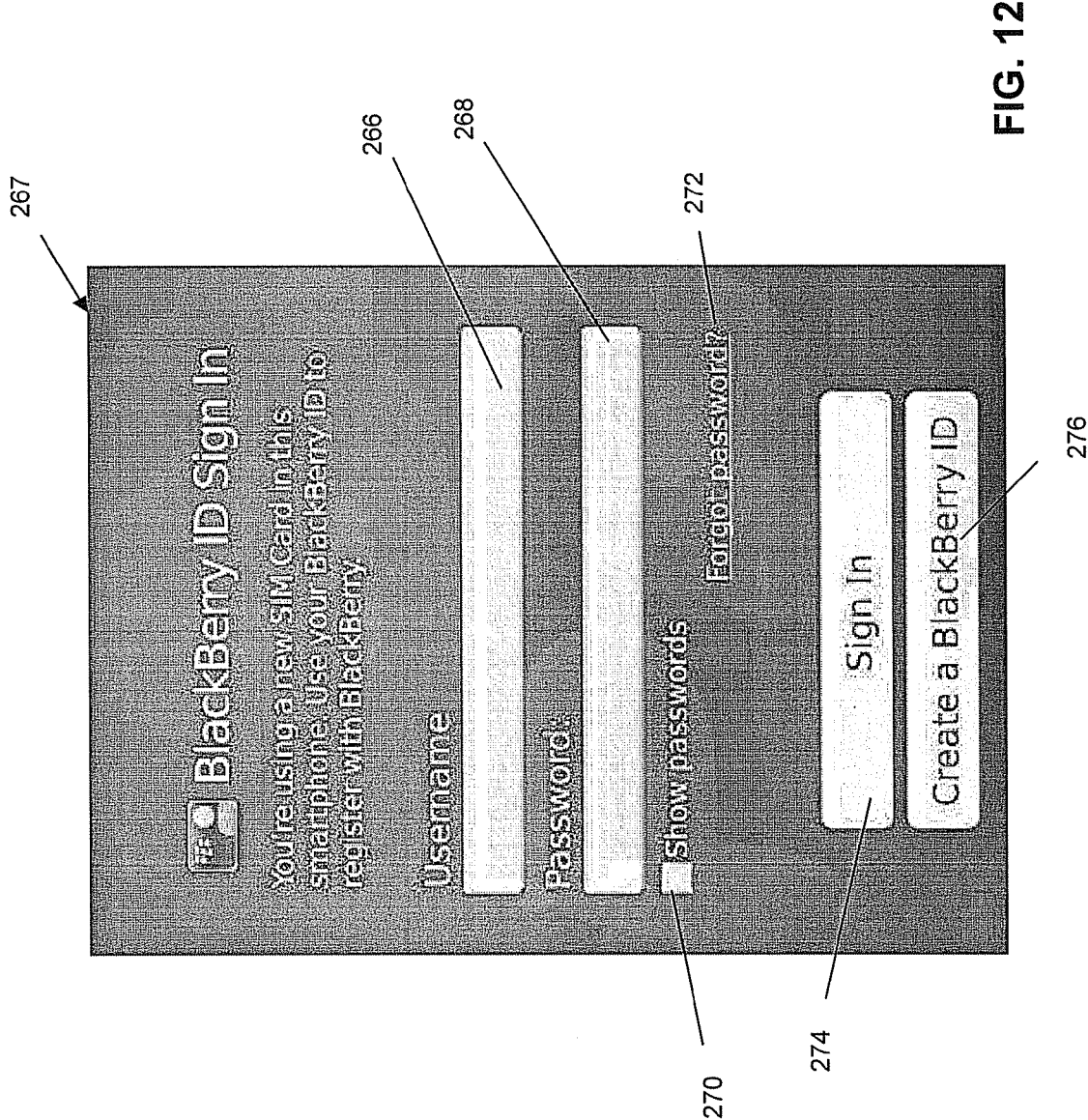
FIG. 12 is a screenshot of an example graphical user interface (GUI) for signing into a username ID account upon detecting a new SIM card.

FIG. 12 shows an example screenshot 267 of a GUI, which is displayed after detecting a new SIM card on the mobile device 100. When the user swaps the SIM card on the same mobile device 100, the user is logged out of the username ID account and is prompted to log back into the username ID account. The user enters in the username ID into the entry field 266, and the corresponding password into the entry field 268. There may be a selection box 270 that controls whether the password is shown or not. A control or button 272 is also provided to activate a process and another GUI to facilitate the retrieval of the password, for example, if the user forgot the password.

The login screen 267 also includes a sign in button 274 that can be selected to sign into the username ID account using the provided information. For example, selecting the button 274 sends the data entered in fields 266 and 268 to the user ID server 10 for verification.

The login screen 267 also include a sign in button 274 that can be selected to sign into the username ID account using the provided information. For example, selecting the button 274 sends the data entered in fields 266 and 268 to the user ID server 10 for verification.

The login screen 267 also includes a button 276 for creating a new username ID. When selected, another GUI is shown asking the user for information used to create the new username ID.

After a SIM swap, and after the user successfully logs into the username ID account, a message is displayed on the mobile device 100 notifying that all data and software services have been re-established.

In another embodiment, after a SIM swap and after successfully logging into the username account ID, the mobile device 100 notifies that access to data and software services is reduced or restricted.

Figure 13:
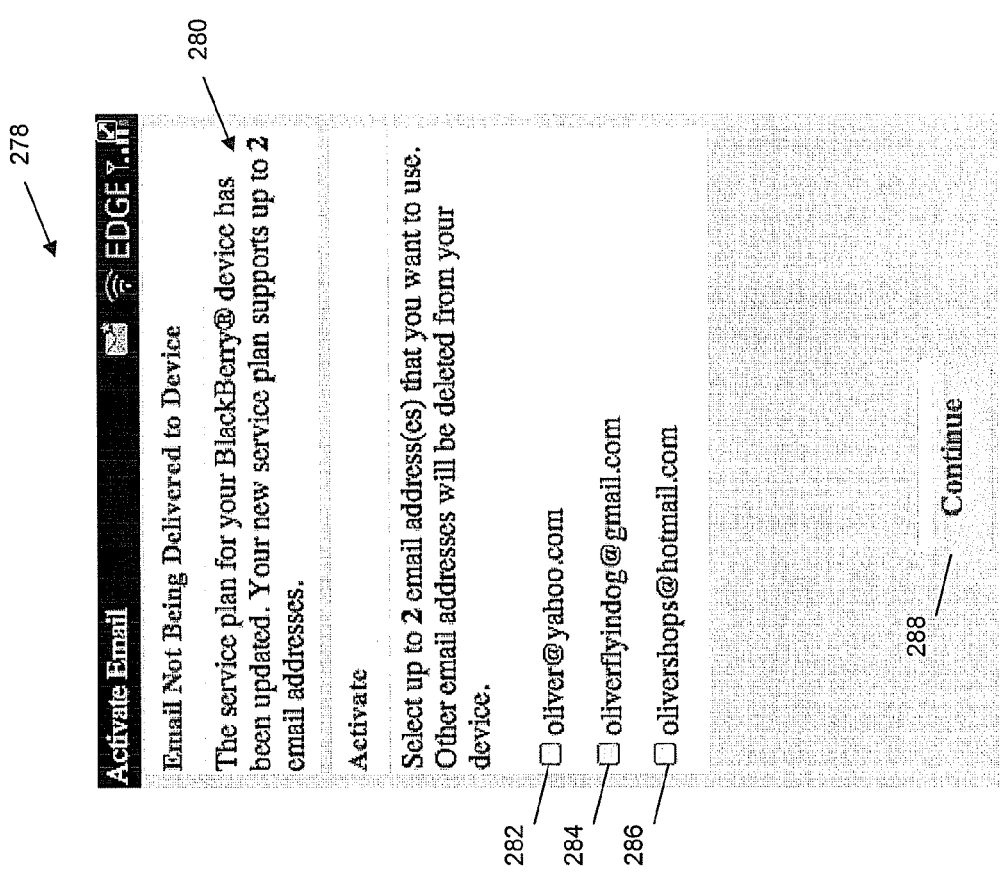
FIG. 13 is a screenshot of an example GUI for selecting a limited number of email addresses based on the service plan associated with the new SIM card.

For example, turning to FIG. 13, an example screenshot 278 is shown for a GUI to facilitate selection of the reduced services. In particular, a message 280 notifies that the service plan for the mobile device 100 has been updated and that it supports up to a limited number of email addresses (e.g. two email addresses). Selection boxes 282, 284, 286 are provided, which are associated with the different email addresses belong to the user. The mobile device 100 receives the user's selection, which indicate which of the email addresses the user wishes to activate on the mobile device 100. For example, the user can only select up to two of the three available email addresses to activate. Thus, the mobile device 100 will receive email from the selected email addresses. The unselected email addresses are deleted from the mobile device 100. Selecting the "continue" button 288 will activate the selected email addresses.

If the user replaces the new SIM card with the previous or old SIM card, and successfully logs back into the username ID account, then the usual settings and services associated with the old SIM card are restored to the mobile device 100. In other words, when swapping the new SIM card back to the original SIM card, the original settings are automatically re-established and maintained. The username ID and password helps to manage such settings and services.

Turning to FIGS. 14 to 17, a number of screenshots are provided showing GUIs for facilitating a user signing out of a username ID account after a SIM swap; receiving an indication to sign in to a new or different username ID account; wiping the memory of the mobile device 100; and then signing into the new username ID account.

FIG. 14 shows a screenshot 290 that can be displayed after detecting a new SIM card. The previous username ID, or reference username ID, 292 (e.g. "daviddixon@gmail.com") is shown and an entry field 294 for the password is provided. The user can sign in to the account by selecting the "sign in" button 296, or can sign out by selecting the "sign out" button 298.

If the user chooses to sign out and sign in again with another username ID, the mobile device 100 displays a warning that the mobile device will be wiped and that the settings will be returned to the factory defaults. Such a warning is shown in FIG. 15, on the screenshot 300. The mobile device 100 displays a button 302 to continue and to wipe the data, as well as a button 304 to cancel the process.

Upon the mobile device 100 receiving a selection of the button 302, a screenshot 306 is displayed, as per FIG. 16. The GUI of the screenshot 306 reconfirms the user's intention to wipe the data, and notifies that the new user won't be able to send or receive email from the previous username ID, also referred herein as a reference username ID, that was registered to the mobile device 100. The mobile device 100 then receives a confirmation input in the entry field 308, such as typing in a predetermined word or phrase. Upon selection of the wipe data button 310, the mobile device 100 wipes the data and restores the factory settings to the mobile device 100. Optionally, the mobile device 100 can receive a selection to cancel the process, for example by the selection of the cancel button 312.

Figure 17:
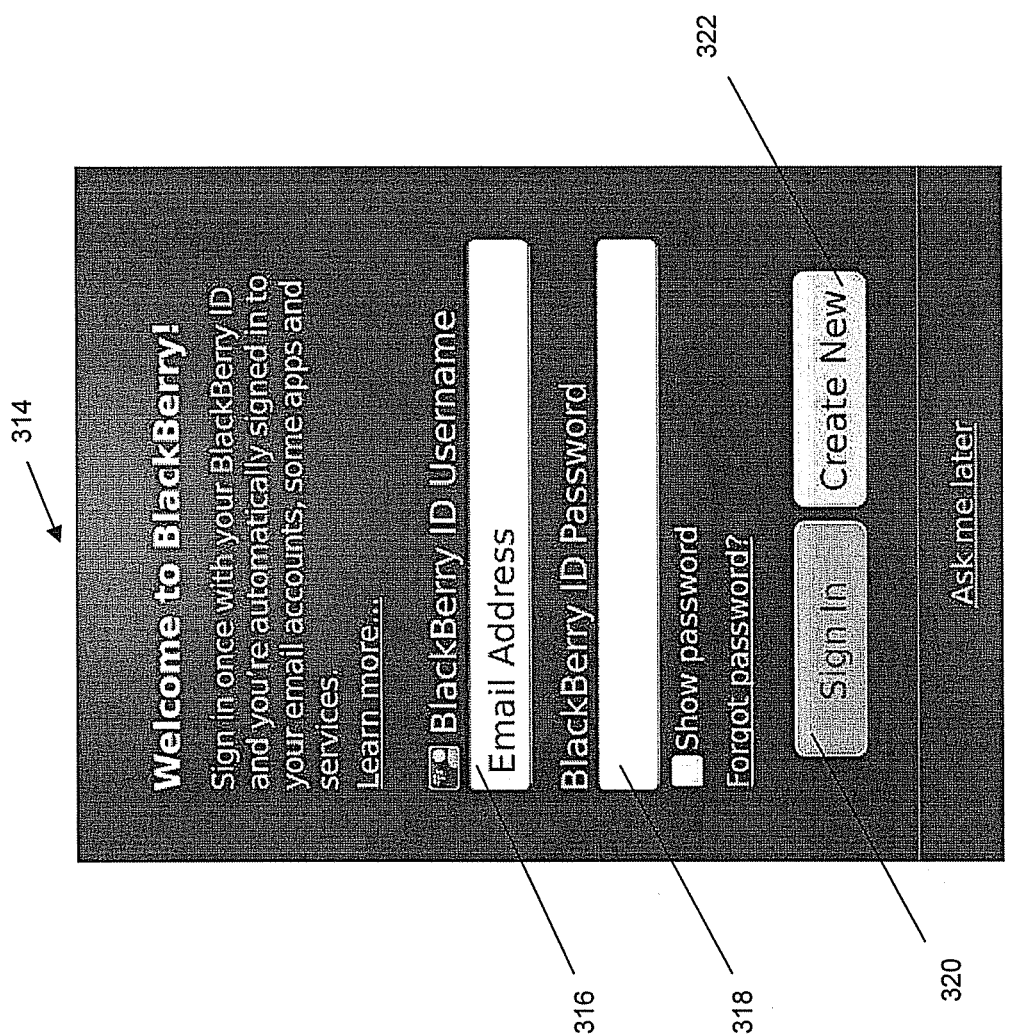
FIG. 17 is a screenshot of an example GUI to sign into a username ID account, or to create a new username ID account.

After the mobile device 100 has been wiped and has been rebooted, the mobile device 100 displays a welcome screen 314, as shown in FIG. 17. The screen 314 includes a username ID entry field 316 and a password entry field 318. Upon the mobile device 100 receiving the new username ID and password, and upon receiving a selection for the "sign in" button 320, the mobile device 100 is logged into the new username ID account. If the user needs to create a new username ID account, the user can select the button 322 to create or register a new username ID account.

It can be appreciated that the systems and methods described herein conveniently manage data and software services associated with a mobile device 100, even after switching or swapping SIM cards. If the same username ID and password are used on the same mobile device, even after a SIM card swap, the data and software services can be maintained for the mobile device. This reduces or obviates the effort and steps typically required to re-establish services after swapping a SIM card.

Furthermore, if a new SIM card belonging to another user is being inserted into the mobile device 100, then advantageously as security to the previous user of the mobile device, the data and settings are wiped from the mobile device 100.

In general, an example method is provided for managing one or more services associated with a mobile device. The method includes: detecting a new identity module card in the mobile device; receiving an input to associate a new username identifier (ID) and a new password with the mobile device, compared to a reference username ID and a reference password that have been previously associated with the mobile device; erasing a portion of a memory associated with the mobile device; and receiving the new username ID and the new password to be associated with the mobile device.

Other example aspects of the method include the portion of the memory being associated with the one or more services. In another example aspect, the new identity module card is any one of a subscriber identity module (SIM) card, a removable user identity module (RUIM) card, and a universal subscriber identity module (USIM) card. In another example aspect, the mobile device displays a message indicating that the new identity module card is detected. In another example aspect, the mobile device sends an identification of the new identity module card and a mobile device ID to a server, and receives from the server a confirmation of whether or not the identification of the new identity module card is new. In another example aspect, upon receiving the new username ID and the new password, the mobile device provides access to the one or more services based on at least one of: the username ID, a mobile device ID, and an identification of the new identity module card.

In general, another example method is provided for managing a service associated with a mobile device. The method includes: detecting a new identity module card in the mobile device; receiving a username identifier (ID) and a password via the mobile device; and, upon verifying that the username ID and the password are identical to a reference username ID and a reference password associated with the mobile device, enabling access to the service.

In another example aspect, the new identity module card is any one of a subscriber identity module (SIM) card, a removable user identity module (RUIM) card, and a universal subscriber identity module (USIM) card. In another example aspect, the mobile device displays a message indicating that the new identity module card is detected. In another example aspect, the mobile device sends an identification of the new identity module card and a mobile device ID to a server, and receives from the server a confirmation of whether or not the identification of the new identity module card is new. In another example aspect, the server comprises a database storing one or more known combinations of mobile device IDs and identifications of identity module cards, and if the identification of the new identity module card cannot be found in association with the mobile device ID on the database, the server returns the confirmation that the identification of the new identity module is new. In another example aspect, the mobile device sends the username ID and the password to a server, and receives from the server an indication of whether or not the username ID and the password are verified. In another example aspect, upon verifying that the username ID and the password are not identical to the reference username ID and the reference password associated with the mobile device, the mobile device denies access to the service. In another example aspect, upon verifying that the username ID and the password are identical to the reference username ID and the reference password associated with the mobile device, a level of access is determined for one or more of the services associated with the mobile device, the one more services comprising the service. In another example aspect, the level of access is determined based on the new identity module card. In another example aspect, the mobile device displays a message describing the level of access to the one or more services.

The schematics and block diagrams used herein are just for example. Different configurations and names of components can be used. For instance, components and modules can be added, deleted, modified, or arranged with differing connections without departing from the spirit of the invention or inventions.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

It will be appreciated that the particular embodiments shown in the figures and described above are for illustrative purposes only and many other variations can be used according to the principles described. Although the above has been described with reference to certain specific embodiments, various modifications thereof will be apparent to those skilled in the art as outlined in the appended claims.

The invention claimed is:

1. A method of managing one or more services associated with a mobile device, the method comprising:
   detecting the mobile device is logged into a first username identifier (ID) account that is currently associated with the mobile device while an identity module card is in the mobile device;
   detecting a new identity module card in the mobile device has replaced the identity module card that was previously used, the new identity module having a different identification compared to the identity module card that was previously used;
   responsive to detecting the new identity module card:
      logging out of the first username ID account;
      displaying a reference username ID associated with the first username ID account that is currently associated with the mobile device;
      providing an option to log back into the first username ID account using the reference username ID, including displaying a field to receive a reference authentication value associated with the reference username ID;
      sending the identification of the new identity module card and a mobile device ID to a server, and receiving from the server a confirmation of whether or not the identification of the new identity module card is new, wherein the server comprises a database storing one or more known combinations of mobile device IDs and identifications of identity module cards, and if the identification of the new identity module card cannot be found in association with the mobile device ID on the database, the server returns the confirmation that the identification of the new identity module is new;
      providing an option to use a new username ID associated with a second username ID account, the new username ID being different compared to the reference username ID;
   responsive to receiving an input to associate the new username ID with the mobile device, erasing a portion of a memory associated with the mobile device, after verifying that the username ID and the authentication value are identical to the reference username ID and the reference authentication value associated with the mobile device, determining a level of access to one or more of the services associated with the mobile device, the one more services comprising the service;
   associating the new username ID with the mobile device; and
   displaying a message describing the level of access to the one or more services.

2. The method of claim 1 wherein the portion of the memory is associated with the one or more services.

3. The method of claim 1 wherein the new identity module card is any one of a subscriber identity module (SIM) card, a removable user identity module (RUIM) card, or a universal subscriber identity module (USIM) card.

4. The method of claim 1 further comprising the mobile device displaying a message indicating that the new identity module card is detected.

5. The method of claim 1 wherein the option to use the new username ID further includes using a new authentication value, the new authentication value being different compared to the reference authentication value; and wherein the input to associate the new username ID with the mobile device includes associating the new authentication value with the mobile device.

6. The method of claim 5 further comprising, after receiving the new username ID and the new authentication value, the mobile device providing access to the one or more services based on at least one of: the new username ID, a mobile device ID, or an identification of the new identity module card.

7. A method of managing a service associated with a mobile device, the method comprising:
   detecting the mobile device is logged into a first username identifier (ID) account that is currently associated with the mobile device while an identity module card is in the mobile device;
   detecting a new identity module card in the mobile device has replaced the identity module card that was previously used, the new identity module having a different identification compared to the identity module card that was previously used;
   responsive to detecting the new identity module card;
      logging out of the first username ID account;
      displaying a username ID currently associated with the first username ID account that is currently associated with the mobile device and a field to receive an authentication value;
   receiving the authentication value via the mobile device;
   providing an option to log back into the first username ID account using a reference username ID, including displaying a field to receive a reference authentication value associated with the reference username ID;
   sending the identification of the new identity module card and a mobile device ID to a server, and receiving from the server a confirmation of whether or not the identification of the new identity module card is new, wherein the server comprises a database storing one or more known combinations of mobile device IDs and identifications of identity module cards, and if the identification of the new identity module card cannot be found in association with the mobile device ID on the database, the server returns the confirmation that the identification of the new identity module is new;
   after verifying that the username ID and the authentication value are identical to the reference username ID and a reference authentication value associated with the mobile device, logging back into the first username ID account and enabling access to a service using the new identity module card and without erasing a portion of a memory on the mobile device associated with the username ID, after verifying that the username ID and the authentication value are identical to the reference username ID and the reference authentication value associated with the mobile device, determining a level of access to one or more of the services associated with the mobile device, the one more services comprising the service; and
   displaying a message describing the level of access to the one or more services.

8. The method of claim 7 wherein the new identity module card is any one of a subscriber identity module (SIM) card, a removable user identity module (RUIM) card, or a universal subscriber identity module (USIM) card.

9. The method of claim 7 further comprising the mobile device displaying a message indicating that the new identity module card is detected.

10. The method of claim 7 further comprising sending the username ID and the authentication value to a server, and receiving from the server an indication of whether or not the username ID and the authentication value are verified.

11. The method of claim 7 further comprising, after verifying that the username ID and the authentication value are not identical to the reference username ID and the reference authentication value associated with the mobile device, denying access to the service.

12. The method of claim 7 wherein the level of access is determined based on the new identity module card.

13. A mobile device comprising a non-transitory computer readable medium, the non-transitory computer readable medium comprising computer executable instructions for managing a service associated with the mobile device, the computer executable instructions comprising:
   detecting the mobile device is logged into a first username identifier (ID) account that is currently associated with the mobile device while an identity module card is in the mobile device;
   detecting a new identity module card in the mobile device has replaced the identity module card that was previously used, the new identity module having a different identification compared to the identity module card that was previously used;
   responsive to detecting the new identity module card:
      logging out of the first username ID account;
      displaying a username ID currently associated with the first username ID account that is currently associated with the mobile device and a field to receive an authentication value;
   receiving the authentication value via the mobile device;
   providing an option to log back into the first username ID account using a reference username ID, including displaying a field to receive a reference authentication value associated with the reference username ID;
   sending the identification of the new identity module card and a mobile device ID to a server, and receiving from the server a confirmation of whether or not the identification of the new identity module card is new, wherein the server comprises a database storing one or more known combinations of mobile device IDs and identifications of identity module cards, and if the identification of the new identity module card cannot be found in association with the mobile device ID on the database, the server returns the confirmation that the identification of the new identity module is new;
   after verifying that the username ID and the authentication value are identical to the reference username ID and a reference authentication value associated with the mobile device, logging back into the first username ID account and enabling access to a service using the new identity module card and without erasing a portion of a memory on the mobile device associated with the username ID, after verifying that the username ID and the authentication value are identical to the reference username ID and the reference authentication value associated with the mobile device, determining a level of access to one or more of the services associated with the mobile device, the one more services comprising the service; and
displaying a message describing the level of access to the one or more services.

14. The mobile device of claim 13 wherein the new identity module card is any one of a subscriber identity module (SIM) card, a removable user identity module (RUIM) card, or a universal subscriber identity module (USIM) card.

15. The mobile device of claim 13 wherein the computer executable instructions further comprises the mobile device displaying a message indicating that the new identity module card is detected.

16. A non-transitory computer readable medium comprising computer executable instructions for managing a service associated with a mobile device, the computer executable instructions comprising:
  detecting the mobile device is logged into a first username identifier (ID) account that is currently associated with the mobile device while an identity module card is in the mobile device;
  detecting a new identity module card in the mobile device has replaced the identity module card that was previously used, the new identity module having a different identification compared to the identity module card that was previously used;
  responsive to detecting the new identity module card:
    logging out of the first username ID account;
    displaying a username ID currently associated with the first username ID account that is currently associated with the mobile device and a field to receive an authentication value;
  receiving the authentication value via the mobile device;
  providing an option to log back into the first username ID account using a reference username ID, including displaying a field to receive a reference authentication value associated with the reference username ID;
  sending the identification of the new identity module card and a mobile device ID to a server, and receiving from the server a confirmation of whether or not the identification of the new identity module card is new, wherein the server comprises a database storing one or more known combinations of mobile device IDs and identifications of identity module cards, and if the identification of the new identity module card cannot be found in association with the mobile device ID on the database, the server returns the confirmation that the identification of the new identity module is new;
  after verifying that the username ID and the authentication value are identical to the reference username ID and a reference authentication value associated with the mobile device, logging back into the first username ID account and enabling access to a service using the new identity module card and without erasing a portion of a memory on the mobile device associated with the username ID, after verifying that the username ID and the authentication value are identical to the reference username ID and the reference authentication value associated with the mobile device, determining a level of access to one or more of the services associated with the mobile device, the one more services comprising the service; and
  displaying a message describing the level of access to the one or more services.

17. A non-transitory computer readable medium comprising computer executable instructions for managing one or more services associated with a mobile device, the computer
  detecting the mobile device is logged into a first username identifier (ID) account that is currently associated with the mobile device while an identity module card is in the mobile device;
  detecting a new identity module card in the mobile device has replaced the identity module card that was previously used, the new identity module having a different identification compared to the identity module card that was previously used;
  responsive to detecting the new identity module card:
    logging out of the first username ID account;
    displaying a reference username ID associated with the first username ID account that is currently associated with the mobile device;
    providing an option to log back into the first username ID account using the reference username ID, including displaying a field to receive a reference authentication value associated with the reference username ID;
    sending the identification of the new identity module card and a mobile device ID to a server, and receiving from the server a confirmation of whether or not the identification of the new identity module card is new, wherein the server comprises a database storing one or more known combinations of mobile device IDs and identifications of identity module cards, and if the identification of the new identity module card cannot be found in association with the mobile device ID on the database, the server returns the confirmation that the identification of the new identity module is new;
    providing an option to use a new username ID associated with a second username ID account, the new username ID being different compared to the reference username ID;
  responsive to receiving an input to associate the new username ID with the mobile device, erasing a portion of a memory associated with the mobile device, after verifying that the username ID and the authentication value are identical to the reference username ID and the reference authentication value associated with the mobile device, determining a level of access to one or more of the services associated with the mobile device, the one more services comprising the service;
  associating the new username ID with the mobile device; and
  displaying a message describing the level of access to the one or more services.

18. A mobile device comprising a non-transitory computer readable medium, the non-transitory computer readable medium comprising computer executable instructions managing one or more services associated with a mobile device, the computer executable instructions comprising:
  detecting the mobile device is logged into a first username identifier (ID) account that is currently associated with the mobile device while an identity module card is in the mobile device;
  detecting a new identity module card in the mobile device has replaced the identity module card that was previously used, the new identity module having a different identification compared to the identity module card that was previously used;
  responsive to detecting the new identity module card:
    logging out of the first username ID account;

displaying a reference username ID associated with the first username ID account that is currently associated with the mobile device;

providing an option to log back into the first username ID account using the reference username ID, including displaying a field to receive a reference authentication value associated with the reference username ID;

sending the identification of the new identity module card and a mobile device ID to a server, and receiving from the server a confirmation of whether or not the identification of the new identity module card is new, wherein the server comprises a database storing one or more known combinations of mobile device IDs and identifications of identity module cards, and if the identification of the new identity module card cannot be found in association with the mobile device ID on the database, the server returns the confirmation that the identification of the new identity module is new;

providing an option to use a new username ID associated with a second username ID account, the new username ID being different compared to the reference username ID;

responsive to receiving an input to associate the new username ID with the mobile device, erasing a portion of a memory associated with the mobile device, after verifying that the username ID and the authentication value are identical to the reference username ID and the reference authentication value associated with the mobile device, determining a level of access to one or more of the services associated with the mobile device, the one more services comprising the service;

associating the new username ID with the mobile device; and displaying a message describing the level of access to the one or more services.

* * * * *